United States Patent [19]

Elixmann et al.

[11] Patent Number: 5,721,905
[45] Date of Patent: Feb. 24, 1998

[54] COMMUNICATION SYSTEM COMPRISING A DISTRIBUTED DATABASE SYSTEM

[75] Inventors: Martin Elixmann; Rainer Gallersdörfer; Karin Klabunde; Karl R. Nelleben, all of Aachen, Germany

[73] Assignee: U.S. Philips Corporation, New York, N.Y.

[21] Appl. No.: 384,091

[22] Filed: Feb. 6, 1995

[30] Foreign Application Priority Data

Feb. 5, 1994 [DE] Germany ............... 44 03 614.0

[51] Int. Cl.⁶ ........................................... G06F 17/30
[52] U.S. Cl. .................. 395/608; 395/610; 395/615; 364/282.3; 364/281
[58] Field of Search ................... 395/600, 608, 395/615, 500; 364/281, 282.3

[56] References Cited

U.S. PATENT DOCUMENTS

| | | | |
|---|---|---|---|
| 4,876,643 | 10/1989 | McNeill et al. | 395/290 |
| 5,155,837 | 10/1992 | Liu et al. | 395/500 |
| 5,212,789 | 5/1993 | Rago | 395/608 |
| 5,406,620 | 4/1995 | Pei | 379/220 |
| 5,515,531 | 5/1996 | Fujiwara et al. | 395/603 |

OTHER PUBLICATIONS

David Dewitt et al. "Parallel Database Systems: The Future of High Performance Database Systems",Communications of the ACM,vol.35 No.6, Jun. 1992.

*Primary Examiner*—Thomas G. Black
*Assistant Examiner*—Greta L. Robinson
*Attorney, Agent, or Firm*—Steven R. Biren

[57] ABSTRACT

A communication system having a plurality of service control points which can be mutually coupled and are assigned to at least one service switching point for executing services, a database system, and a service management system for managing the services. To enhance the availability of the database system, this database system comprises distributed databases which have each a database control point. At least several databases are provided for storing copies of logically coherent partitions of the total database. To execute a database operation, a copy of a partition and the database control point that manages that partition are located by reading a Table.

10 Claims, 1 Drawing Sheet

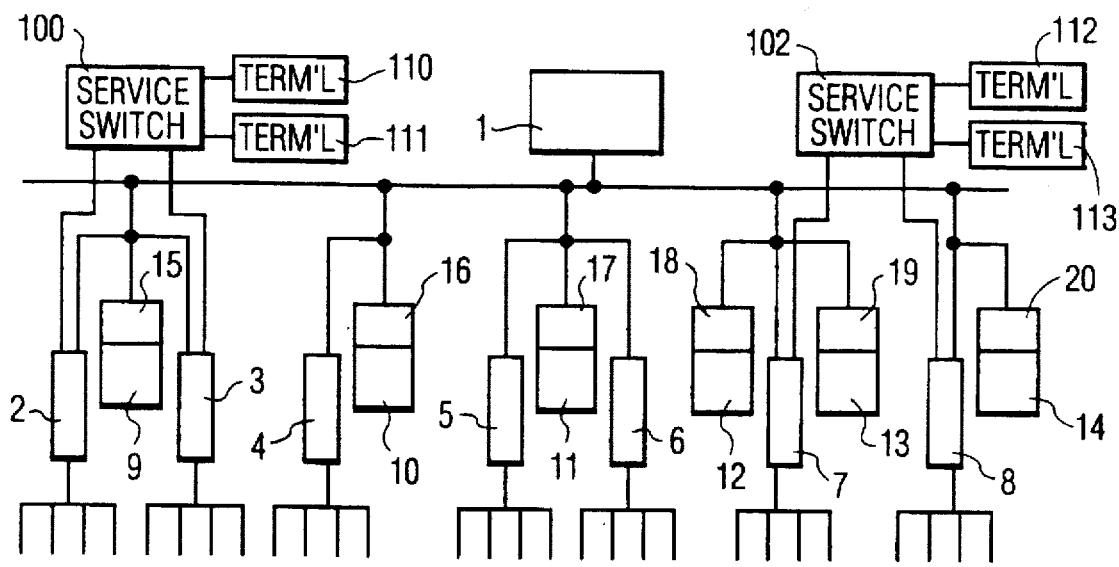
FIG. 1
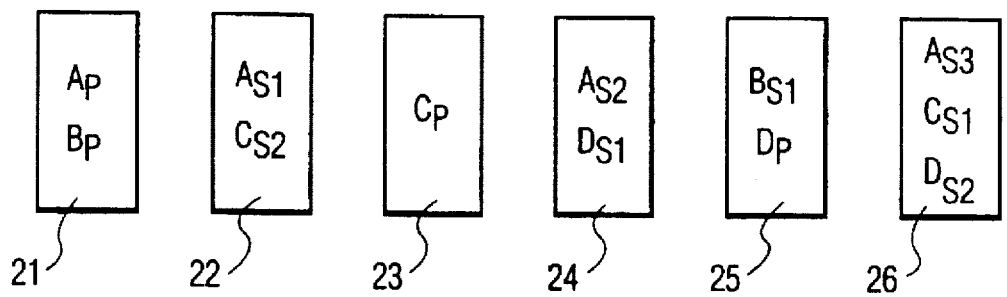
FIG. 2
FIG. 3

COMMUNICATION SYSTEM COMPRISING A DISTRIBUTED DATABASE SYSTEM

BACKGROUND OF THE INVENTION

The invention relates to a communication system comprising a plurality of control points which service can be mutually coupled and are assigned to at least one service switching point for executing services, a database system, and a service management system for managing the services.

From the Journal for Applied Telecommunication, Net Special 12, March 1993, pages 11 to 15, is known a communication system (intelligent network) which is coupled to a service management system via service switching points of the public telecommunication network and service control points. Certain switching points in the public communication network are used, on the one hand, for carrying out switching functions to interconnect various terminal units (for example, telephone traffic) or further switching points, and on the other hand, for carrying out a switching operation to a service execution network (overlay network). The service control points are used, in essence, for carrying out a service by executing a service logic program (logical utility program). The service management system is responsible, for example, for re-installation or modification of a service (service logic program), for establishing statistics and so on.

One service of German Telekom is, for example, the private information service Tele-Info-Service. If a subscriber selects a particular service number (for example, 0190 . . . ), this is detected by a service switching point and this service switching point accordingly establishes a connection to the network provided for service processing. The service control point assigned to this service switching point carries out the service because the associated service logic program is loaded and processed. As a rule, data files of a database system are then also accessed for this purpose. The publication mentioned above also discloses a database system having a central database. A bottleneck may occur in such a central database if many service logic programs simultaneously wish to access the central database. Delays or interruptions of the services may then occur because the data are not available at the instant of access.

SUMMARY OF THE INVENTION

Therefore, it is an object of the invention to provide a communication system in which the availability of the data of the database system is virtually always maintained.

This object is achieved by a communication system of the type set out in the opening paragraph, in that the database system comprises distributed databases each having a database control point, at least several of the distributed databases storing copies of logically coherent partitions of the total database. For a database operation the service management system or a service switching point or a database control point can access a Table to read from the Table the location of a database control point that manages the copy of a relevant partition. That the database control point (whose location has been read out) then carries out the database operation.

In the communication system according to the invention the database system has distributed databases which have associated database control points. The total database is subdivided into logically coherent areas (partitions). It is possible for more than one copy of a given partition to be available, the copies bring stored in various locally separated databases. In this database system not every local database need contain a copy of at least one partition. Some databases may be empty and be held in reserve for data to be fed at a later stage.

A database in which a copy of a partition is stored can be identified from a Table, when the Table is read by the service management system, a service control point or a database control point. The service management system can, for example, read the Table if specific changes are to be made in a service logic program. A service control point can read the Table if there is a service call from a service switching point belonging to that control point. The service management system and service control point, however, can also leave the reading of the Table to the database control point of that particular database.

If a database operation is to be performed, the entries are first read from the Table by the service management system, a service control point or a database control point. After a copy of a desired partition has been located, the associated database control point will carry out a read or a write operation (database operation) on the copy stored in the assigned database.

As a result of the distribution of the databases, the availability of the data of the database system is enhanced, because the service logic programs need not simultaneously access one central database.

The availability of the data is further enhanced if at least a secondary copy in addition to the primary copy of a partition is available. A database containing a primary or a secondary copy of a partition cannot store a further copy of this partition. All the copies of a partition can be written-in independently and in parallel.

The database system may contain a central Table specifying the distribution of the primary and secondary copies. If the Table is accessed many times, this need for access may become a bottleneck and thus cause a delay in database operations that depend on the access to the Table. To avoid such a bottleneck and to increase the speed of database operations, in a further embodiment of the invention each database contains a Table stating the locations at which the primary and secondary copies of the various partitions are stored. The Table is then also accessed by the assigned database control point. The database control point is thereby able to locate a primary or secondary copy and to carry out a database operation on the basis of the Table stored in the assigned database. If the database control point has located a copy in that control point's own database, the database operation is carried out forthwith. If the database control point has not located a copy in its own database, the database control point assigned to the database containing the needed copy is given a command to carry out the database operation. As a result of this separate management of databases by the assigned database control points, it is possible for the database system to be complemented by further databases and assigned database control points, as required (modular system).

If writing operations were carried out independently and in parallel using the primary and all further secondary copies of a partition, it would be impossible to read the data of that partition while it is being written-in. To make it possible to read out these data and keep the communication expenses in the database system low and thus to increase the throughput of the total system, a further embodiment of the communication system is structured as follows: If a writing operation is to be carried out, one database control point is provided for locating the database control point responsible for managing a primary copy of a particular partition. Once the writing operation in the primary copy of that particular partition has been carried out by the this database control point, this control point issues an indication to carry out a writing operation in all the secondary copies of that particular partition.

In this further embodiment, changes are thus made first in a primary copy of a partition and are then made in the secondary copy or copies independent of each other and in parallel. Such asynchronous changes of copies of a partition can be made without much difficulty especially in the communication system according to the invention, because reading operations are generally carried out only when services are executed. Writing operations are necessary only if a new service is installed or service parameters are changed. Compared with the reading operations, the writing operations occur much more seldom. In many cases the primary version of the data is not necessary. Therefore, the writing operations of the secondary copies may be effected asynchronously.

A secondary copy or a primary copy may be accessed for a reading operation. When a reading operation is carried out, a database control point locates the database control point responsible for managing a primary copy or a secondary copy of a particular partition, which responsible database control point is used for carrying out the reading operation in the primary copy or in a secondary copy of that particular partition.

A sequence of accesses for reading and writing in a database is denoted a transaction. Since a database control point controls the read and writing operations of the assigned database, there is thus a local transaction check. To have a more flexible local transaction check, during a read or writing operation a database control point releases the data to be written in or read out, and these data are not accessed when data are written in or read out simultaneously. This means that data of a partition which are changed during a writing operation cannot be read out (write blocking). Data of the partition that do not change can be read out. Similarly, there cannot be a writing operation for the data that are being read out (read blocking).

BRIEF DESCRIPTION OF THE DRAWINGS

A preferred embodiment of the invention will be explained with reference to the drawing.

FIG. 1 shows a part of a diagrammatically shown communication system,

FIG. 2 shows an example of the distribution of primary and secondary copies of partitions in databases, which are included in the communication system as shown in FIG. 1, and FIG. 3 shows three databases containing data of primary and secondary copies of partitions.

DESCRIPTION OF THE PREFERRED EMBODIMENT

FIG. 1 diagrammatically shows part of a communication system comprising a service management system 1, a plurality of service control points 2 to 8 and a plurality of databases 9 to 14 and assigned database control points 15 to 20. The service management system 1, the service control points 2 to 8, and the database control points 15 to 20 are realised for example, as computers. To each service control point 2 to 8 are coupled service switching points 100, 102 shown by way of example. The service switching points are coupled to further service switching points and, optionally, to terminal units 110–113.

A connection between a service switching point and a service control point 2 to 8 is established from a terminal unit by the dialling of particular initial digits of a call number. After further digits of the call number have been received, a service control point 2 to 8 learns from a database 9 to 14 through a database control point 15 to 20 a service logic program which is then executed.

An example of a service is a "Virtual Private Network". With such a service it is possible for particular terminal units to establish a connection to particular subscribers by means of abbreviated dialling.

The service control points 2 to 8 are thus, in essence, provided for carrying out services by executing a service logic program. The service management system 1 manages the services. For example, the system reinstalls or changes a service (service logic program).

The databases 9 to 14 and the database control points 15 to 20 form parts of a database system. The total database is subdivided into logically coherent partitions and distributed over the databases 9 to 14. There is a primary copy and, as required, one or various secondary copies of a partition are also available. An example of the distribution of primary and secondary copies of the partitions of the total database is shown in FIG. 2. This example shown in FIG. 2 contains six databases 21 to 26. The total database is subdivided into four partitions A, B, C and D. In the database 21 are stored primary copies $(A_p, B_p)$ of the partitions A and B. A first secondary copy $A_{s1}$ of partition A and a second secondary copy $C_{s2}$ of partition C is stored in the database 22. The database 23 contains only the primary copy $C_p$ of partition C. The fourth data base 24 contains the second secondary copy $A_{s2}$ of partition A and the first secondary copy $D_{s1}$ of partition D. The memory contents of the database 25 comprise the first secondary copy $B_{s1}$ of partition B and the primary copy $D_p$ of partition D. The last database 26 contains a third secondary copy $A_{s3}$ of partition A, a first secondary copy $C_{s1}$ of partition C and a second secondary copy $D_{s2}$ of partition D.

The distribution of primary and secondary copies of partitions over the various databases may be determined, for example, by the service management system 1. The memory locations of the various primary and secondary copies are accommodated in a Table stored once in each database. The service management system 1 may also manage the Table.

When data of a partition are changed, a writing operation is effected. To enhance the throughput of the system, first the writing operation in the primary copy and then, in succession, in all the secondary copies is effected. A reading operation may either be effected with a primary or a secondary copy. With the database operations (for example, writing operation, read operation), a service control point 2 to 8 or the service management system 1 and a database control point 15 to 20 carry out control operations via various software modules (program parts). The particular program parts will be stated and explained in the following:

Locating a database control point:
  Start:
  Enter name of partition and type of operation;
  Is a database control point assigned to the service management system or to a service control point available?
  Y: Transfer to found database control point;
  N: Search for another database control point; transfer to found database control point;
  End;
Locating a primary or secondary copy:
  Start;

Determine the database control point managing the sought primary or secondary copy by reading the Table occurring in the assigned database;

Is the found database control point available?

N: Interrupt search operation or repeat later on;

Y: Transfer to found database control point or execute a database operation;

End;

Executing a database operation:

Start;

Does message originate from the service management system or from a service control point?

Y: Which database operation occurs?

a) Transfer the changes:

Enable the changes;

Message to execute a writing operation to all the database control points that manage a secondary copy of the partition;

b) Write changed data in a primary copy:

Is reading or writing blocked?

N: Execute a writing operation of primary copy data;

Y: Wait for cancellation of blocking and then execute the writing operation;

c) Read data from a primary or secondary copy:

Is a writing operation executed with data of the copy?

N: Execute a reading operation of data of the copy;

Y: Wait for the end of the writing operation and then execute the reading operation;

d) Abortion:

Changes do not become effective;

N: Write changed data in a secondary copy; End.

When the service management system 1 or a service control point 2 to 8 causes data to be written in or read from a database 9 to 14, first the name of the partition (for example, from the service logic program to be executed) and the type of operation (for example, writing or reading) are entered. The service management system 1 and also the service control point (for example, 2) are each assigned a database control point (for example 17 and 15). If the database control point (for example 15) is available, the name of the partition and the type of operation are transferred to this database and further control operations are carried out there. If the assigned database control point (for example 15) is unavailable, a different, available, database control point (for example 16) is sought and this found database control point (for example 16) is supplied with the associated data for further control.

Depending on the type of operation, a database control point (for example 20) is determined that manages a primary or secondary copy of the sought partition. During a writing operation, the primary copy is to be determined and during a reading operation the primary or secondary copy in the Table contained by the associated database (for example 14) is to be determined. If the sought database control point (for example 19) is unavailable, either the search procedure is interrupted or repeated at a later instant (depending on the service logic program). If the database control point (for example 20) is available, a database operation is executed there after data have been transferred (name of partition, type of operation). If the database control point (for example 20) that has read out a Table also contains a sought primary or secondary copy, the database operation is carried out there.

If the message about the execution of a database operation has been induced by the service management system 1 or a service control point (for example 2), first a check is made to determine what database operations are available. If changes are to be transferred after a writing operation, they are first effectively stored and a message is sent to each database control point (for example 18) that manages a secondary copy. The message causes a writing operation to be performed in each secondary copy.

If data are to be written in a primary copy, a check is made whether currently the reading or writing is blocked. The reading is blocked when data are read out. The writing is blocked when data are written in. If the data are not blocked, the writing operation in the primary copy is performed. In the other case, the writing operation is not performed until the blocking has been cancelled.

If data are to be read from a primary or secondary copy, first the check is made whether the writing is blocked. In the event of a blocking of the writing operation, the data to be read out are changed direct (writing operation). If this is not the case, the reading operation is effected with a primary or a secondary copy. Otherwise, termination of the writing operation (write blocking cancelled) is waited for, after which the reading operation is performed.

If the database operation "abort" is present, the changes do not become effective; i.e., the changed data are not stored.

If the message has come from a database control point (for example 15), the new data are written in the secondary copy.

As a result of errors or bottlenecks in the database system it may happen that changes of data in a secondary copy have not been made. This can be detected by a database control point 15 to 20 by means of a co-entered counter number during a writing operation. In that case either the lacking data can be added or all the data can be written in once again.

An example of the distribution of particular data necessary for a service in a distributed database system will be explained with reference to the service "Virtual Private Network", whose service logic program will be discussed below.

Virtual Private Network:

What digits have been entered?

Digits "11":

Establish connection to the telephone number stored under SN-11;

Digits "12":

Establish connection to the telephone number stored under SN-12;

Digits "13":

Establish connection to the telephone number stored under SN-13;

Character "#":

Enter further digits;

Establish connection to the telephone number entered;

Digits "01 600 123":

Message: "Please enter identification number (PIN)";

Is identification number available?

Y: Message: "Please enter the new telephone number for an abbreviated call";

Change of a telephone number stored under the abbreviated call;

Other characters:

Message: "Digits cannot be interpreted".

When the service logic program "Virtual Private Network" is executed by a service control point, data from the database system are necessary. FIG. 3 shows an example of a database system of the communication system according to the invention, comprising three databases 27, 28, 29. The database 27 contains a primary copy of a first partition. The first partition has a partition name "P.1139" and contains the identification number "0815" under the address "PIN". The primary copy of the first partition is stored in the database 27 and further secondary copies are stored in the databases 28 and 29. A second partition carrying the partition name "U.600.1234" contains under the addresses SN-11, SN-12 and SN-13 the telephone numbers "0241-1552", "040-34870" and "040-3279", respectively. In the database 28 the primary copy of the secondary partition is stored and in the database 29 a secondary copy of the second partition is stored.

During the execution of the service logic program "Virtual Private Network" a service control point checks what digits have been entered by a terminal unit. The digits fed by the terminal unit to the service switching point are transferred to the assigned service control point. If the digits "11" have been entered, an attempt is made to establish a connection to the terminal unit that has the telephone number "0241-1552". This telephone number is stored under the address SN-11 in the partition "U.600.1234" of the database 28 or 29 (FIG. 3). The reading operation may thus be carried out in the database 28 or 29. If the digits "12" or "13" have been entered, an attempt is made to establish a connection to the terminal unit that can be reached by the telephone number "040-34870" or "040-3279".

If the character "#" has been entered, the entry of a telephone number that cannot be reached via an abbreviated call is waited for. After this telephone number has been entered, an attempt is made to establish a connection to that particular terminal unit.

If the digits "01 600 123" have been entered, a message is sent to the terminal unit by the service control point. The message requests a subscriber to enter an identification number. If the identification number is there, the telephone number stored under a particular abbreviated dial code is changed, as required. The identification number is stored under the partition name "P.11139" in the databases 27, 28 and 29. The change is then first made in the primary copy stored in the database 28. Subsequently, the secondary copy in the database 29 is changed.

If other digits not in a database are entered, a message is sent by the service control point. The message indicates that the digits cannot be interpreted.

We claim:

1. A communication system comprising:

a database system storing a total database, a plurality of service control points, means for mutually coupling said service control points, and a service switching point for selectively connecting one of a multiplicity of terminal units to one of said service control points for executing a service from said total database, characterized in that:

said total database comprises a plurality of distributed databases, each of said distributed databases comprising a respective database control point, a plurality of said distributed databases respectively include means for storing copies of one or more logically coherent partitions of said total database, the database control point associated with each respective one of said plurality of distributed databases managing database operations involving the partitions stored in the associated database, said communication system further comprises:

a Table containing information relating to the locations of copies of said partitions, means, responsive to request by said one of said terminals for a service involving a given database operation, for (i) identifying a given database control point associated with a database which stores a partition of said total database relating to the requested service, and (ii) enabling said service switching point to access said Table to determine the location of said given database control point and assign management of the requested service to said given database control point, and means enabling any given database control point to access said Table to determine the location of another database control point associated with a database storing a partition which is not stored in the database associated with the given database control point, a primary copy of one of said partitions is stored in a first of said databases and a secondary copy of said partition is stored in a second of said databases, a database containing either a primary or a secondary copy of a given partition does not store a further copy of said partition, each of said databases contains said Table denoting the locations of the primary and secondary copies of said partitions, and for carrying out a database operation, a selected database control point locates a primary or secondary copy of a required partition with the aid of the Table stored in the database associated with the selected database control point.

2. A system as claimed in claim 1, characterized in that for carrying out a writing operation the selected database control point locates the database control point responsible for managing the primary copy of a partition to be written in, and once the writing operation in the primary copy of the partition to be written in has been carried out, an indication to carry out a writing operation in all the secondary copies of that partition is issued.

3. A system as claimed in claim 1, characterized in that for carrying out a reading operation the selected database control point locates the database control point responsible for managing one of the copies of a partition to be read, and the database control point responsible for managing said one of the copies of said partition is used for reading said partition.

4. A system as claimed in claim 3, characterized in that during a reading or a writing operation a database control point releases data which are not accessed when a writing and a reading operation are carried out simultaneously.

5. A communication system comprising:

a database system storing a total database, a plurality of service control points, a service management system, means for mutually coupling said service control points, and a service switching point for selectively connecting one of a multiplicity of terminal units to one of said service control points for executing a service from said total database, characterized in that:

said total database comprises a plurality of distributed databases, each of said distributed databases comprising a respective database control point, a plurality of said distributed databases respectively include means for storing copies of one or more logically coherent partitions of said total database, the database control point associated with each respective one of said plurality of distributed databases managing database operations involving the partitions stored in the associated database said communication system further comprises:
- a Table containing information relating to the locations of the copies of said partitions,
- means, responsive to request by said one of said terminals or by said device management system for a service involving a given database operation, for identifying a given database control point associated with a database which stores a partition of said total database relating to the requested service, and
  a) when said request is by said one of said terminals, for enabling said service switching point to access said Table to determine the location of said given database control point and assign management of the requested service to said given database control point, and
  b) when said request is by said service management system, for enabling said service management system to access said Table to determine the location of said given database control point and assign management of the requested service to said given database control point, and
- means enabling any given database control point to access said Table to determine the location of another database control point associated with a database storing a partition which is not stored in the database associated with the given database control point.

6. A system as claimed in claim 5, characterized in that a primary copy of one of said partitions is stored in a first of said databases, and a secondary copy of said partition is stored in a second of said databases, and
- a database containing either a primary or a secondary copy of a given partition does not store a further copy of said partition.

7. A system as claimed in claim 6, characterized in that each of said databases contains a Table denoting the locations of the primary and secondary copies of said partitions, and
- for carrying out a database operation, a selected database control point locates a primary or secondary copy of a required partition with the aid of the Table stored in the database associated with the selected database control point.

8. A system as claimed in claim 7, characterized in that for carrying out a writing operation the selected database control point locates the database control point responsible for managing the primary copy of a partition to be written in, and
- once the writing operation in the primary copy of the partition to be written in has been carried out, an indication to carry out a writing operation in all the secondary copies of that partition is issued.

9. A system as claimed in claim 7, characterized in that for carrying out a reading operation the selected database control point locates the database control point responsible for managing one of the copies of a partition to be read, and
- the database control point responsible for managing said one of the copies of said partition is used for reading said partition.

10. A system as claimed in claim 9, characterized in that during a reading or a writing operation a database control point releases data which are not accessed when a writing and a reading operation are carried out simultaneously.

* * * * *